US010604332B2

United States Patent
Zeik et al.

(10) Patent No.: US 10,604,332 B2
(45) Date of Patent: Mar. 31, 2020

(54) AEROSOL CONTAINER HAVING VALVE CUP WITH INTEGRAL BAG

(71) Applicant: The Procter & Gamble Company, Cincinnati, OH (US)

(72) Inventors: Douglas Bruce Zeik, Liberty Township, OH (US); Matthew Aaron Neumann, Montgomery, OH (US); Scott Edward Smith, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 145 days.

(21) Appl. No.: 15/235,227

(22) Filed: Aug. 12, 2016

(65) Prior Publication Data

US 2018/0044097 A1     Feb. 15, 2018

Related U.S. Application Data

(63) Continuation-in-part of application No. 14/664,282, filed on Mar. 20, 2015, now abandoned, and a continuation-in-part of application No. 14/061,243, filed on Oct. 23, 2013, now Pat. No. 9,132,955.

(51) Int. Cl.
    *B65D 83/44*     (2006.01)
    *B65D 83/38*     (2006.01)
    *B65D 83/62*     (2006.01)

(52) U.S. Cl.
    CPC .............. *B65D 83/44* (2013.01); *B65D 83/38* (2013.01); *B65D 83/384* (2013.01); *B65D 83/62* (2013.01)

(58) Field of Classification Search
    CPC ...... B65D 83/38; B65D 83/384; B65D 83/44; B65D 83/62
    See application file for complete search history.

(56) References Cited

U.S. PATENT DOCUMENTS

| | | |
|---|---|---|
| 2,863,699 A | 12/1958 | Elser |
| 3,325,053 A | 6/1967 | DeBoer et al. |
| 3,333,743 A | 8/1967 | Charles |
| 3,343,730 A | 9/1967 | Arthur |
| 3,403,804 A | 10/1968 | Roberto |
| 3,433,134 A | 3/1969 | Vellekoop |

(Continued)

FOREIGN PATENT DOCUMENTS

| | | | |
|---|---|---|---|
| EP | 0179538 A2 * | 4/1986 | ........... B05B 9/0838 |
| EP | 0221562 A2 | 11/1986 | |

(Continued)

OTHER PUBLICATIONS

PCT Search Report; dated Oct. 19, 2017; PCT/US2017/046389; 13 Pages.

(Continued)

*Primary Examiner* — Nicholas J. Weiss
(74) *Attorney, Agent, or Firm* — Sarah M DeCristofaro (57) ABSTRACT

An aerosol container having an open neck at the top and a closed end bottom longitudinally spaced therefrom. The container has a valve cup and bag. The valve cup and bag are integral. The valve cup is attachable to the neck in sealing relationship. This arrangement provides for propellant to be disposed intermediate the container and bag. Product can be disposed in the bag for selective dispensing by a user actuated valve.

10 Claims, 3 Drawing Sheets

(56) References Cited

U.S. PATENT DOCUMENTS

| | | | |
|---|---|---|---|
| 3,450,254 A | 6/1969 | Miles | |
| 3,718,165 A | 2/1973 | Grothoff | |
| 3,804,759 A | 4/1974 | Becker et al. | |
| 3,827,607 A | 8/1974 | Schultz | |
| 3,961,113 A | 6/1976 | Marco | |
| RE30,093 E | 9/1979 | Burger | |
| 4,234,108 A | 11/1980 | Diamond | |
| 4,330,066 A | 5/1982 | Berliner | |
| 4,463,056 A | 7/1984 | Steele | |
| 4,762,254 A * | 8/1988 | Nitta | B65D 83/38 222/402.1 |
| 4,969,577 A | 11/1990 | Werding | |
| 5,083,685 A | 1/1992 | Amemiya | |
| 5,127,556 A | 7/1992 | Sporri | |
| 5,219,005 A | 6/1993 | Stoffel | |
| 6,019,252 A | 2/2000 | Benecke et al. | |
| 6,068,811 A | 5/2000 | Koda | |
| 6,254,820 B1 | 7/2001 | Cornell | |
| 6,499,311 B2 | 12/2002 | Mahajan | |
| 6,649,121 B1 | 11/2003 | Hamamoto et al. | |
| 7,028,866 B2 | 4/2006 | Kunesh et al. | |
| 7,279,207 B2 | 10/2007 | Darr | |
| 7,303,087 B2 | 12/2007 | Flashinski et al. | |
| 7,810,675 B2 * | 10/2010 | Wheatley | B65D 83/38 222/105 |
| 8,074,847 B2 * | 12/2011 | Smith | B65D 83/38 222/394 |
| 8,096,327 B2 | 1/2012 | Hirz | |
| 8,245,888 B2 | 8/2012 | Andersen et al. | |
| 8,505,762 B2 | 8/2013 | Holbach et al. | |
| 8,511,522 B2 | 8/2013 | Chan et al. | |
| 8,752,731 B2 | 6/2014 | Nimmo et al. | |
| 8,844,765 B2 | 9/2014 | Tryon | |
| 8,851,322 B2 | 10/2014 | Heineken | |
| 8,869,842 B2 | 10/2014 | Smith | |
| 8,985,398 B2 | 3/2015 | Demarest et al. | |
| 9,061,795 B2 | 6/2015 | Girardot et al. | |
| 9,132,952 B1 | 9/2015 | Knepp | |
| 9,132,955 B2 | 9/2015 | Smith et al. | |
| 9,162,372 B2 | 10/2015 | Van Hove et al. | |
| 9,221,596 B2 | 12/2015 | Patel et al. | |
| 9,296,550 B2 | 3/2016 | Smith et al. | |
| 9,701,430 B2 | 7/2017 | Smith | |
| 2007/0145079 A1 * | 6/2007 | Casamento | B65D 83/38 222/386.5 |
| 2009/0014679 A1 | 1/2009 | Hygema et al. | |
| 2009/0045222 A1 * | 2/2009 | Nimmo | B65D 83/0061 222/95 |
| 2009/0078902 A1 | 3/2009 | Flynn | |
| 2010/0264165 A1 | 10/2010 | Hansen et al. | |
| 2011/0248035 A1 | 10/2011 | Peirsman et al. | |
| 2012/0132607 A1 | 5/2012 | Landman et al. | |
| 2013/0037580 A1 | 2/2013 | Armstrong | |
| 2015/0284117 A1 | 10/2015 | Smith | |
| 2016/0176619 A1 | 6/2016 | Smith | |
| 2017/0283158 A1 | 10/2017 | Schulz | |
| 2018/0044096 A1 | 12/2018 | Neumann et al. | |

FOREIGN PATENT DOCUMENTS

| | | |
|---|---|---|
| EP | 1 801 030 A2 | 6/2007 |
| EP | 2 481 688 A1 | 8/2012 |
| EP | 2 930 125 A1 | 10/2015 |
| WO | WO 91/08099 A1 | 6/1991 |
| WO | WO 2004/083074 A1 | 9/2004 |

OTHER PUBLICATIONS

All Office actions, U.S. Appl. No. 15/235,237.
PCT Search Report; dated Nov. 22, 2017; PCT/US2017/046390; 12 Pages.

* cited by examiner

AEROSOL CONTAINER HAVING VALVE CUP WITH INTEGRAL BAG

FIELD OF THE INVENTION

The present invention relates to aerosol dispensers and methods of manufacture thereof.

BACKGROUND OF THE INVENTION

Aerosol dispensers are well known in the art. Aerosol dispensers typically comprise an outer container which acts as a frame for the remaining components and as a pressure vessel for propellant and product contained therein. Outer containers made of metal are well known in the art. However, metal containers can be undesirable due to high cost and limited recyclability. Attempts to use plastic have occurred in the art. Relevant attempts in the art to employ plastic in aerosol dispensers are found in U.S. Pat. Nos. 2,863,699; 3,333,743; 9,296,550 and 2009/0014679.

The outer containers are typically, but not necessarily, cylindrical. The outer container may comprise a bottom for resting on horizontal surfaces such as shelves, countertops, tables etc. The bottom of the outer container may comprise a re-entrant portion as shown in U.S. Pat. No. 3,403,804 or base cup as shown in U.S. Pat. No. 9,061,795. Sidewalls defining the shape of the outer container extend upwardly from the bottom to an open top.

The open top defines a neck for receiving additional components of the aerosol dispenser. The industry has generally settled upon a nominal neck diameter of 2.54 cm, for standardization of components among various manufacturers, although smaller diameters, such as 20 mm, are also used. Various neck shapes are shown in U.S. Pat. Nos. 6,019,252; 7,303,087; 7,028,866 and 7,279,207.

Typically a valve cup is inserted into the neck. The valve cup is sealed against the neck to prevent the escape of the propellant and loss of pressurization, such as described in U.S. Pat. Nos. 8,074,847; 8,096,327; 8,844,765 and 8,869,842. The valve cup holds the valve components which are movable in relationship to the balance of the aerosol dispenser. Suitable valves are shown in commonly assigned U.S. Pat. Nos. 8,511,522 and 9,132,955.

Aerosol dispensers, having a valve cup and movable valve components, may comprise different embodiments for holding, storing, and dispensing product used by the consumer. In one embodiment, the product and propellant are intermixed. When the user actuates the valve, the product and propellant are dispensed together. This embodiment may utilize a dip tube. The dip tube takes the product and propellant mixture from the bottom of the outer container. This embodiment may be used, for example, to dispense shaving cream foams.

A bag may be used to contain product for selective dispensing by a user. Dispensing of product from the bag occurs in response to the user actuating the valve. The bag separates product within the bag from propellant disposed between the bag and container.

Particularly, a collapsible, flexible bag may be sealed to the opening on the underside of the valve cup or may be placed between the valve cup and the container. This bag limits or even prevents intermixing of the contents of the bag and the components outside of the bag. Thus, product may be contained in the bag. Propellant may be disposed between the outside of the bag and the inside of the outer container. Upon actuation of the valve, a flow path out of the bag is created. This embodiment is commonly called a bag in can and may be used, for example, in dispensing shaving cream gels. Alternatively, a bag may be directly joined to the valve housing, in a configuration commonly called a bag on valve.

An aerosol container having a bag therein may be made from a dual layer preform, having plural layers disposed one inside the other. Relevant attempts in the art include U.S. Pat. Nos. 3,450,254; 4,330,066; 6,254,820; RE 30093 E; WO 9108099 and US 2011/0248035 A1. But each of these attempts requires a separate operation to attach the bag to the relevant component. Each attachment step takes time in manufacturing and creates the opportunity for leakage if not correctly performed.

If a valve is to be assembled into an aerosol, typically the valve cup is crimped onto the neck of the aerosol container. But this operation is expensive and is difficult to perform with a plastic valve cup.

A separate interlock may be used to attach a valve assembly to a valve cup, particularly a plastic valve assembly and plastic valve cup are used. Suitable interlocks include bayonet fittings and threads. But these interlocks require complex manufacturing steps to facilitate the compound motion.

Accordingly, this application is directed to solving the problem of attaching a plastic bag to an appropriate component of an aerosol container.

SUMMARY OF THE INVENTION

In one embodiment the invention is an aerosol container comprising an outer container having an open neck with a top, and valve cup having a bag integrally depending therefrom. The bag is disposed in the outer container. The valve cup is sealingly joined to the outer container to contain propellant therein. In other embodiments the invention comprises methods of making an aerosol container using a bag and valve cup. The bag and valve cup may be integral or joined together from separate component parts.

BRIEF DESCRIPTION OF THE DRAWINGS

The drawings are to scale, unless otherwise noted.

DETAILED DESCRIPTION OF THE INVENTION

Figures 1, 2, 3, 4:
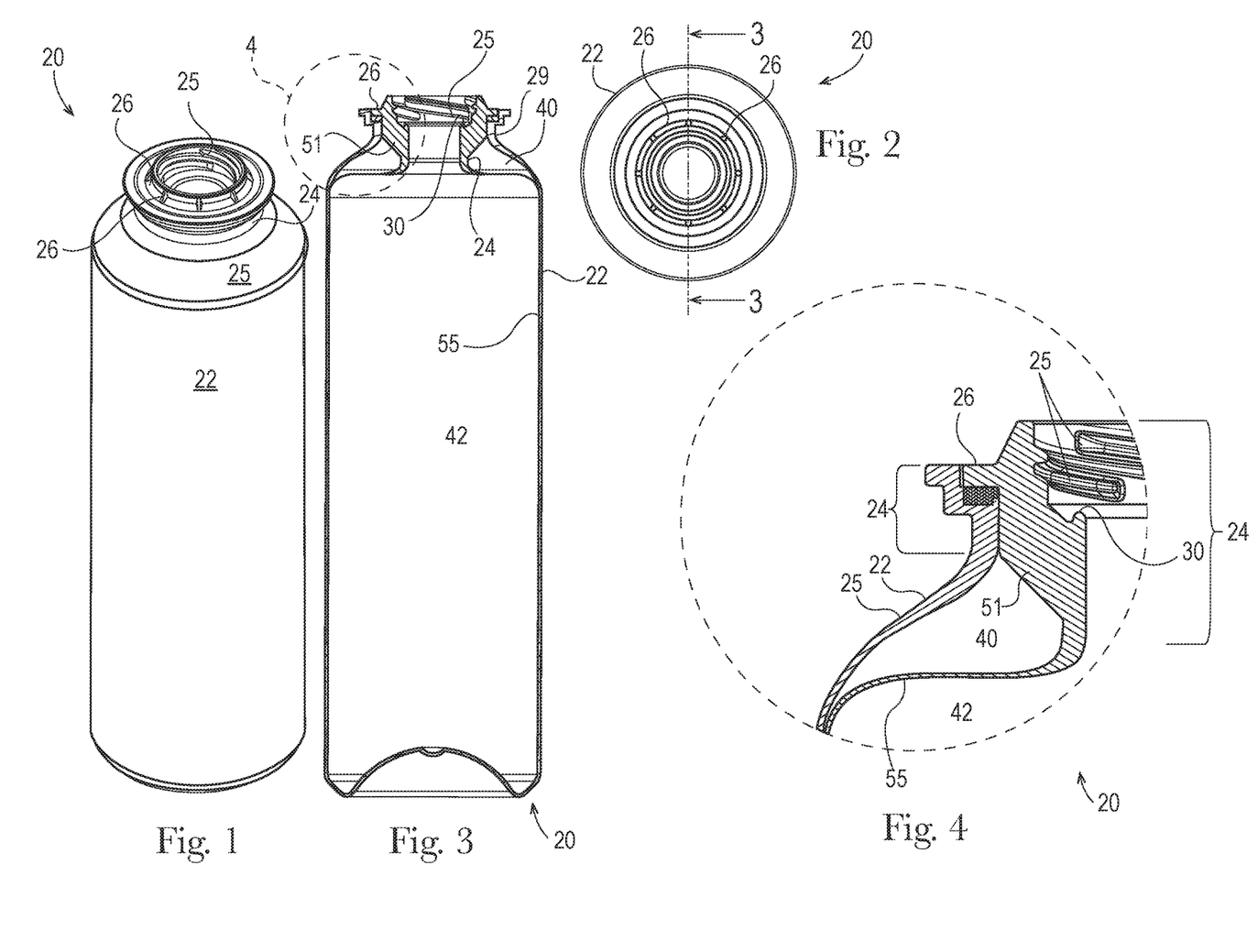
FIG. 1 is a perspective view of an aerosol container according to the present invention.
FIG. 2 is a top plan view of the aerosol container of FIG. 1.
FIG. 3 is a vertical sectional view of the aerosol container of FIG. 2, taken along line 3-3 of FIG. 2.
FIG. 4 is a partial, enlarged view of the aerosol dispenser of FIG. 3.

Referring to FIGS. 1 and 2, an aerosol container 20 having a longitudinal axis is shown. The aerosol container 20 comprises a pressurizeable outer container 22 usable for such a dispenser 20. The outer container 22 has a neck 24 into which a valve cup 26 is sealingly disposed. A valve assembly and actuator are disposed in the valve cup 26 for selective dispensing of product 42 from the dispenser 20. A seal 30 having a surface for sealing a valve assembly to the valve cup 26 is disposed below the valve cup 26 and valve assembly to prevent escape of product to ambient. As used herein, the terms aerosol dispenser 20 and aerosol container 20, can be used interchangeably, recognizing that an aerosol container 20 may be a subset of an aerosol dispenser 20, and have an outer container 22, valve cup 26 sealed thereto with a bag 55 joined to the valve cup 26, and optionally propellant 40, but not necessarily a valve assembly, actuator, labeling, etc.

As used herein, the top of the dispenser 20 or container 22 is taken as the uppermost part, when the dispenser 20 or container 22 is vertically oriented in its normal use or storage position. The terms 'above' and 'below' refer to relative positions towards and away from the top, respectively.

The outer container 22 may comprise metal or preferably plastic, as are known in the art. The plastic may be polymeric, and particularly comprise polyethylene terephthalate (PET) for all of the components described herein. The outer container 22 defines a longitudinal axis and may have an opening at one end thereof. The opening is typically at the top of the pressurizeable container when the pressurizeable container is in its-in use position. The opening defines a neck 24, to which other components may be sealingly joined.

As the top of the outer container 22 is approached, the outer container 22 may have a neck 24. The neck 24 may be connected to the container sidewall by a shoulder 25. The shoulder 25 may more particularly be joined to the sidewall by a radius. The shoulder 25 may have an annular flat. The neck 24 may have a greater thickness at the top of the outer container 22 than at lower portions of the neck 24 to provide a differential thickness. Such differential thickness may be accomplished through having an internally stepped neck 24 thickness.

A valve cup 26 may be sealed to the opening of the outer container 22, as described in further detail below. The valve cup 26 may be sealed to the neck 24 of the outer container 22 using the class 1 TPE material. Polyester based TPE sold by Kraiburg TPE GmbH & Co KG of Waldkraiburg, Germany under the name HTC8791-52 and by DuPont of Delaware under the name HYTEL may be used for good resistance to Silicone and adhesion to PET. Or a Styrenic bloc copolymer based TPE such as Kraiburg HTC8791-24 or Krayton elastomer may be used, providing easier process and lower density. Other seal materials include silicone, rubber and other conformable materials.

If desired, the valve cup 26 may be sealed to the container utilizing a press fit, interference fit, solvent welding, laser welding, vibration welding, spin welding, adhesive or any combination thereof. An intermediate component, such as a sleeve or connector may optionally be disposed intermediate the valve cup 26 and neck 24 or top of the outer container 22. Any such arrangement is suitable, so long as a seal adequate to maintain the pressure results.

A valve assembly, in turn, may be disposed within the valve cup 26. The valve assembly provides for retention of product 42 within the aerosol dispenser 20 until the product 42 is selectively dispensed by a user. The valve assembly may be selectively actuated by an actuator. A nozzle and related valve assembly components may optionally be included, depending upon the desired dispensing and spray characteristics. The valve assembly may be attached using conventional and known means. The valve assembly and actuator may be conventional and do not form part of the claimed invention.

Selective actuation of the valve assembly allows the user to dispense a desired quantity of the product 42 on demand. Illustrative and non-limiting products 42 include shave cream, shave foam, body sprays, body washes, perfumes, cleansers, air fresheners, astringents, foods, paint, etc.

A product delivery device may be used to contain and/or provide for delivery of product 42 from the dispenser 20 upon demand. Suitable product delivery devices comprise pistons, bags 23, dip tubes, and do not form part of the claimed invention, except as described herein.

The pressurizeable container may further include a propellant 40. The propellant 40 may comprise hydrocarbons, nitrogen, air and mixtures thereof. Propellant 40 listed in the US Federal Register 49 CFR 1.73.115, Class 2, Division 2.2 are also considered acceptable. The propellant 40 may particularly comprise a Trans-1,3,3,3-tetrafluoroprop-1-ene, and optionally a CAS number 1645-83-6 gas. One such propellant 40 is commercially available from Honeywell International of Morristown, N.J. under the trade name HFO-1234ze or SOLSTICE.

If desired, the propellant 40 may be condensable. Generally, the highest pressure occurs after the aerosol dispenser 20 is charged with product 42 but before the first dispensing of that product 42 by the user. A condensable propellant 40, when condensed, provides the benefit of a flatter depressurization curve at the vapor pressure, as product 42 is depleted during usage. A condensable propellant 40 also provides the benefit that a greater volume of gas may be placed into the container at a given pressure. A condensable propellant 40, such as HFO-1234ze, may be charged to a gage pressure of 100-400 kPa at 21 degrees C.

If desired, the outer container 22, valve cup 26, valve assembly, and/or piston may be polymeric. By polymeric it is meant that the component is formed of a material which is plastic, comprises polymers, and/or particularly polyolefin, polyester or nylons, and more particularly PET. Thus, the entire aerosol dispenser 20 or, specific components thereof, may be free of metal, allowing microwaving. Microwave heating of the aerosol dispenser 20 or pressurizable container therefor provides for heating of the product 42 prior to dispensing. Heating of the product 42 prior to dispensing may be desirable if the product 42 is applied to the skin, becomes more efficacious at lower viscosities, or is to be eaten.

The valve cup 26 may have a valve cup 26 periphery complementary to the neck 24 periphery. At least one of the valve cup 26 and/or container neck 24 may have one or more channels therethrough. Additionally or alternatively, the channels may be formed at the interface between the valve cup 26 and container neck 24. The channels may be formed by irregularities, such as crenulations, merlins, serrations, notches, teeth, etc. between valve cup 26 and/or container neck 24.

The outer container 22, and all other components, except the TPE seal, may comprise, consist essentially of or consist of PET, PEN, Nylon, EVOH or blends thereof to meet DOT SP 14223. Such materials may be selected from a single class of recyclable materials, as set forth above by the Society of Plastics Industry. The valve cup 26 and/or bag 55 may comprise plural layers such as nylon with EVOH and/or PET. Three layers may be utilized, such as PET/Nylon/PET or PET/EVOH/PET. The layers may be co-molded or overmolded. The multi-layer arrangements may provide increased barrier resistance and reduced failure rates.

If desired, the outer container 22, and/optionally the product delivery device, may be transparent or substantially transparent. This arrangement provides the benefit that the consumer knows when product 42 is nearing depletion and allows improved communication of product 42 attributes, such as color, viscosity, etc. Also, labeling or other decoration of the container may be more apparent if the background to which such decoration is applied is clear.

The outer container 22 may define a longitudinal axis of the aerosol container 20. The outer container 22 may be axisymmetric as shown, or, may be eccentric. While a round cross-section is shown, the invention is not so limited. The cross-section may be square, elliptical, irregular, etc. Furthermore, the cross section may be generally constant as shown, or may be variable. If a variable cross-section is selected, the outer container 22 may be barrel shaped, hourglass shaped, or monotonically tapered.

The outer container 22 may range from 6 to 60 cm, and particularly 10 to 40 cm in height, taken in the axial direction and from 3 to 60 cm, and particularly 4 to 10 cm in diameter if a round footprint is selected. The outer container 22 may have a volume ranging from 40 to 1000 cc exclusive of any components therein, such as a product delivery device. The outer container 22 may be injection stretch blow molded. If so, the injection stretch blow molding process may provide an overall stretch ratio of greater than 8, 8.5, 9, 9.5, 10, 12, 15 or 20 and less than 50, 40 or 30.

The outer container 22 may sit on a base. The base is disposed on the bottom of the outer container 22. Suitable bases include petaloid bases, champagne bases, hemispherical or other convex bases used in conjunction with a base cup. Or the outer container 22 may have a generally flat base with an optional punt.

A manifold may supply propellant 40, under pressure, through at least one channel between the valve cup 26 and container neck 24. The manifold may be retractingly disposed above the container 22. The manifold may be brought into contact with the valve cup 26, forming a temporary seal therebetween. Suitable channels are particularly described in commonly assigned U.S. Pat. No. 8,869,842 to Smith at FIG. 8, column 7, lines 57 to column 8, line 2 and column 8, lines 44-60. While the temporary seal is established between the manifold and valve cup 26, the propellant 40 may be charged into the 22.

The aerosol container 20, as presented to a user may have an initial pressure. The initial pressure is the highest pressure encountered for a particular filling operation, and corresponds to no product 42 yet being dispensed from the product delivery device. As product 42 is depleted, the outer container 22 approaches a final pressure. The final pressure corresponds to depletion of substantially all product 42, except for small residual, from the product delivery device. One benefit of the invention is that the residual product 42, remaining at end of life, is unexpectedly minimized.

This arrangement provides the benefit that propellant 40 may be charged to a lesser pressure than the desired starting pressure, decreasing propellant 40 charge time and reducing pressure applied to the charging machinery. Another benefit is that propellant 40 is disposed as needed for the end use when the aerosol dispenser 20 is ready for sale, product 42 fill and upon product 42 depletion may be recharged with product 42 and reused.

At 21 degrees C., the outer container 22 may be pressurized to an internal gage pressure of 100 to 1300, 110 to 490 or 270 to 420 kPa. A particular aerosol container 20 may have an initial propellant 40 pressure of 1100 kPa and a final propellant 40 pressure of 120 kPa, an initial propellant 40 pressure of 900 kPa and a final propellant 40 pressure of 300 kPa, an initial propellant 40 pressure of 500 kPa and a final propellant 40 pressure of 0 kPa, and any values therebetween.

If a permanent seal between components of the aerosol container 20 is desired, the seal may be welded. Particularly, if the components have compatible melt indices, such components may be sealed by welding to retain propellant therein. Suitable welding processes may include sonic, ultrasonic, spin, and laser welding. Welding may be accomplished with a commercially available welder, such as available from Branson Ultrasonics Corp. of Danbury, Conn. Alternatively or additionally, the channel may prophetically be blocked by a plug or sealed by adhesive bonding. Suitable sealing processes are particularly described in commonly assigned U.S. Pat. No. 8,869,842 to Smith at FIG. 9 and column 8, lines 30-43.

Referring to FIGS. 3-4 and examining the components in more detail, the valve cup 26 may be internally threaded. The threads 25 may or may not circumscribe the neck 24, as desired. One or more threads 25 may be utilized, with four threads 25, each thread 25 subtending about 90 degrees having been found suitable. The valve assembly may have complementary external threads. The valve is assembled into the valve cup 26 by screwing onto the complementary threads 25.

The assembly of the valve onto the valve cup 26 is intended to be permanent, although the valve may be replaced if desired. For example, the aerosol dispenser 20 may be refilled and reused with a different product 42, necessitating a new valve suitable for that particular product 42.

The valve cup 26 may have a seal 30. The seal 30 is between the inside of the valve cup 26 and valve assembly. The seal 30 prevents escape of product 42 and attendant propellant 40 if a dip tube configuration is used or escape of product 42 if a bag 55 is used.

The seal 30 is disposed below the threads 25. By 'below' it is meant the seal 30 is proximal to the base of the container 22 relative to the threads 25. That is, the seal 30 is preferably entirely disposed between the bottom thread 25 and the base of the container 22. The seal 30 is smaller in diameter than the threads, so that the complementary component, such as a valve, can be inserted through the threads 25.

This arrangement provides the benefit, not predicted by the art, that the seal is closer to the centerline of the container 22, reducing movement of the seal during pressurization and reducing attendant leakage. Also less seal 30 area is present, than sealing across the top or neck 24 of the container 22. But a relatively smaller diameter seal increases the moment arm from the outside of the container 22 to the seal 30, so that a relatively larger seal 30 diameter, may be desired. In any case, the seal 30 diameter is less than the thread 25 diameter.

The threads 25, or other interlock, are measured at the smallest respective diameter, often referred to as the thread land, as the smallest diameter control insertion of components through the valve cup 26. The seal 30 is measured at the largest diameter.

Measurement of diameters is done using a CT scan, an XM Series coordinate measuring machine, available from Keyence America of Itasca, Ill. or a caliper gauge as is available from the Starrett Company, of Athol, Mass. The diameters are measured in an unpressurized state.

The seal 30 provides a friction fit or compression fit against loss of pressurized product 42 and/or propellant 40 to ambient. The seal 30 may be smaller in diameter than the valve assembly, so that the seal 30 is compressed upon insertion of the valve. The seal 30 goes into compression due to compressive forces applied by the valve assembly when threaded or otherwise fitted into the neck 24. If desired particular material for the seal 30 may be co-injected with the valve cup 26.

The seal 30 may have a diameter of 7 to 23 mm and preferably 10 to 20 mm. The threads 25 may have a diameter of 10 to 30 mm, and preferably 15 to 25 mm. A thread 25 diameter of 18.3 mm and a seal 30 diameter of 13.6 mm have been found suitable. The ratio of thread 25 diameter to seal diameter may range from 1.1:1 to 1.5:1, and preferably from 1.3:1 to 1.4:1. The seal 30 may be longitudinally disposed at least 1 mm, particularly 1 to 5 mm below the lowest thread 25.

A thread 25 configuration having four threads 25 disposed 90 degrees out with each thread subtending 100 degrees, an 8.1 mm lead of axial travel in one turn, a 2.0 mm pitch between threads and a thread run-in with a 0.26 mm radius has been found to work well for an internal thread 25 diameter of 18.3 mm.

The threads 25 may be integrally molded with the container 22 or with the valve cup 26. This arrangement provides threads 25 within the neck 24 of the outer container 22, to accept a valve assembly. By integral it is meant that the threads 25 and substrate from which the threads 25 radially protrude are made together be unitary and cannot be separated with destruction or unintended gross deformation, and are preferably molded in the same operation.

This arrangement provides the benefit that the valve cup 26 and interlock can be made from a preform 60. A preform 60 can be made in a single injection molding operation, providing tolerances suitable for mass production. A first preform 60 is then blow molded in known fashion to make the outer container 22. The threads 25 are above the blow molding operation, preventing undue dimensional distortion thereof. A second preform 60 can be used to make the valve cup 26 as the finish and internal bag 55 as the body upon blow molding thereof. One of skill will understand the blow molding step may also include stretching as is known in the art.

This arrangement also provides the benefit a bag 55 can be used as the product delivery device. The bag 55 can be integral with the valve cup 26. By integral it is meant that the bag 55 and valve cup 26 are monolithic, molded at the same time or molded of two different materials melted together in a permanent manner. An integral bag 55 and valve cup 26 cannot be separated into two components without tearing or undue deformation. A container 22 made from a preform 60 using ISBM is referred to herein as a molded container 22.

One of skill will recognize the preform 60 may be used to make the outer container 22 or a bag 55 for use with the aerosol container 20 of this invention. One of skill will recognize a bag 55 is commonly used to contain product 42 and keep such product 42 isolated from the propellant 40.

Or the bag 55 may be directly attached to the valve cup 26. The bag 55 may be integrally injection molded with the valve cup 26. If the preform 60 is to be stretched into a bag 55, the preform 60 may have a wall thickness of 1 to 3 mm. The resulting bag 55 is collapsible upon depletion of product 42 therefrom. The resulting bag 55 may have a thickness of 0.07 to 0.2 mm.

Figure 6:
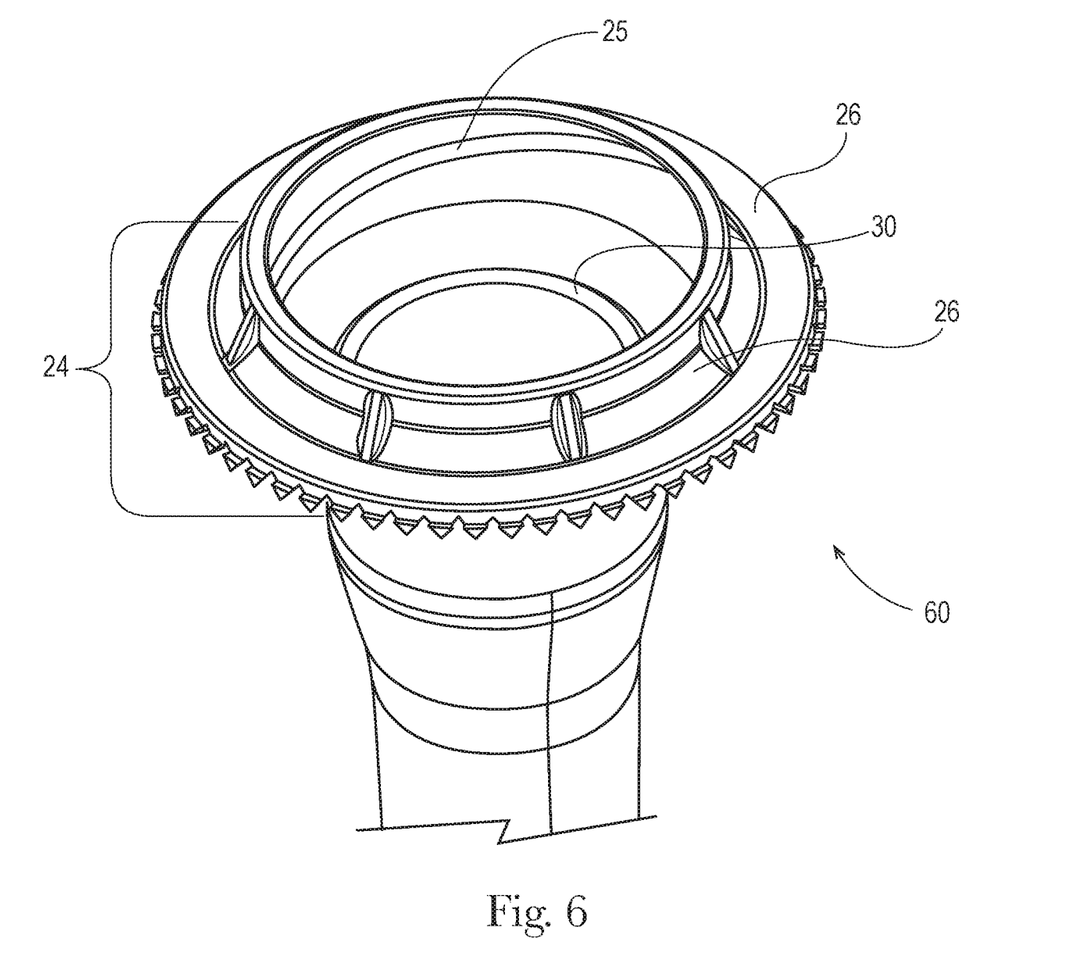
FIG. 6 is a fragmentary perspective view of a preform according to the present invention.

Referring to FIG. 6, if desired, the preform 60 may have one or more external ribs 51 thereon. The ribs 51 may be generally longitudinally oriented. The ribs 51 provide for plastic deformation when the second preform 60 is nested inside the first preform 60, so that the preforms 60 are held together by frictional engagement. The arrangement provides for ease of assembly to conduct the simultaneous blow molding step, so that both preforms 60 are blow molded together, saving manufacturing expense. Alternatively or additionally, the first preform 60 may have internal ribs 51, also providing a friction fit. Or the ribs 51 may be internal to the outer container 22.

Figure 5:
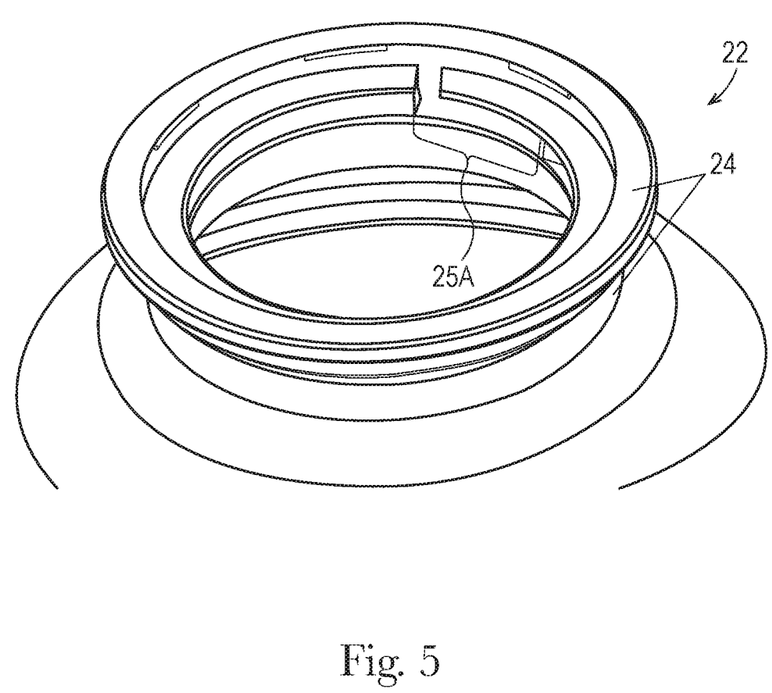
FIG. 5 is a fragmentary perspective view of an alternative embodiment of an outer container having a bayonet fitting interlock.

Referring to FIG. 5, in an alternative embodiment, the interlock can comprise a mechanical fitting, such as but not limited to a bayonet fitting 25A. The bayonet fitting 25A is an interlock which provides mechanical interference to prevent a complementary valve installed therein from being expelled under propellant 40 pressure. A suitable bayonet fitting 25A has a circumferential rotation of 60 to 120 degrees to seat the valve in place.

In variant embodiments, one of skill will understand that the invention includes configurations having plural bags 55. The plural bags 55 may be coaxial and optionally concentric. Or the plural bags 55 may be side-by-side. If desired, the bag(s) 55 may be pleated, and particularly longitudinally pleated, as is known in the art to provide for preferential collapse.

While the embodiments above show the valve cup 26 sealed to the top of the container 22, one of skill will realize the invention is not so limited. The valve cup 26 may also seal to the inside or outside of the neck 24 of the container 22. If desired, the valve cup 26 and preform 60 may be joined together from separate component parts via adhesive, welding as described above, etc.

The aerosol container 20 may be made by providing nested preforms 60 comprising an outer preform 60 and inner preform 60 disposed therein. The inner preform 60 has a valve cup 26 at the open end thereof. The preforms 60 are blowmolded together to form an outer container 22 and having an open end and an inner bag 55 depending therefrom towards the closed end of the outer container. Propellant 40 is charged between the bag 55 and outer container 22. The valve cup 26 is sealing joined to the open end of the outer container 22 to contain the propellant 40 therein and form an aerosol container. The aerosol container may then be stored as needed or directly shipped for product 42 fill, installing the valve assembly, actuator, label, etc.

Alternatively, inner bag 55/valve cup 26 combination and an outer container 22 and may be provided. The inner bag 55 is inserted in the open end of the outer container 22. Propellant 40 is charged between the bag 55 and outer container 22. As described above, the valve cup 26 is sealing joined to the open end of the outer container 22 to contain the propellant 40 therein and form an aerosol container. The aerosol container may then be stored as needed or directly shipped for product 42 fill, installing the valve assembly, actuator, label, etc.

One of skill will recognize the plural preform assembly of the invention may be used with trigger pump sprayers or finger pump sprayers, if an aerosol container is not desired. In a variant embodiment, a non-aerosol system using an elastically deformable band may be used, as described in commonly assigned U.S. Pat. No. 8,631,970. If so, the valve cup 26 is joined but not sealingly joined to the neck 24 of the outer container 22.

Combinations

A. An aerosol container comprising:
   an outer container having an open neck, and
   a bag disposed in said outer container,
   said bag having a valve cup integral therewith, said valve cup being joined to said neck of said outer container.

B. An aerosol container according to paragraph A wherein said valve cup is directly joined to said neck without an intermediate component therebetween.

C. An aerosol container according to paragraphs B and C wherein said bag and said valve cup comprise different materials.
D. An aerosol container according to paragraphs A, B and C wherein said bag comprises a laminate of overmolded materials.
E. An aerosol container according to paragraphs A, B, C, and D wherein said outer container and said valve cup are welded together in sealing relationship.
F. An aerosol container according to paragraphs A, B, C, D and E wherein said valve cup further comprises a plurality of longitudinally oriented ribs, said ribs being usable to frictionally engage said valve cup to said outer container.
G. An aerosol container according to paragraphs A, B, C, D, E and F wherein said valve cup has a valve cup outer diameter and said neck of said outer container has an outer neck diameter greater than said valve cup outer diameter.
H. An aerosol container comprising:
 an outer container having an open neck with a top, and a valve cup having a bag integrally depending therefrom, said bag being disposed in said outer container, said valve cup being sealingly joined to said top of said neck of said outer container.
I. An aerosol container according to paragraph H further comprising propellant between said outer container and said bag.
J. An aerosol container according to paragraph H and I wherein said outer container has a closed bottom, and said bag is not joined to said bottom of said outer container.
K. A method of making a container for an aerosol, said method comprising the steps of:
 providing a first preform for an outer container having an open neck,
 providing a second preform having a finish for a valve cup and having a body for a bag and being integrally joined to said finish,
 disposing said second preform in said first preform,
 simultaneously blow molding said first preform and said second preform to yield an outer container, a bag therein with an integral valve cup proximate said neck,
 installing propellant between said bag and said outer container,
 sealing said valve cup to said neck of said outer container so that said propellant is disposed between said bag and said container, said bag being suitable for receiving product in said bag and being dispensable therefrom in response to user actuation of a valve.
L. A method according to paragraph K wherein said step of disposing said propellant into said outer container is performed before said step of sealing said valve cup to said neck.
M. A method according to paragraphs K and L wherein said valve cup has a plurality of channels therethrough, and said step of installing said propellant in said outer comprises inserting said propellant through said channels and comprising the step of sealing said channels.
N. A method according to paragraphs K, L and M wherein said valve cup has an annular ledge and channels are disposed on said ledge.
O. A method according to paragraph N wherein said channels comprise radially oriented serrations.
P. A method according to paragraphs, K, L, M, N and O further comprising the step of installing a user operable valve into said valve cup wherein operation of said valve can dispense product from said bag.
Q. A method according to paragraphs K, L, M, N, O and P wherein said valve cup further comprises internal threads and said valve is installed on said valve cup by threading onto said internal threads.
R. A method according to paragraphs K, L, M, N, O, P and Q further comprising the step of frictionally engaging said first preform to said second preform, prior to simultaneously blowmolding said preforms.
S. A method according to paragraphs K, L, M, N, O, P, Q and R wherein said frictional engagement occurs through engagement of longitudinally oriented ribs disposed on at least one of said first preform and said second preform.
T. A method of making a container for an aerosol, said method comprising the steps of:
 providing an outer container having an open neck,
 providing a valve cup having a bag disposable in said outer container and integrally joined to said valve cup,
 disposing said bag in said outer container,
 installing propellant between said bag and said outer container, and
 sealing said valve cup to said neck of said outer container, to form an container for receiving product in said bag and being dispensable therefrom in response to user actuation of a valve.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm" and a pressure disclosed as "about 1100 kPa" is intended to include 1103.2 kPa.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern. All limits shown herein as defining a range may be used with any other limit defining a range. That is the upper limit of one range may be used with the lower limit of another range, and vice versa.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:
1. An aerosol container comprising:
 an outer container having an open neck;
 a valve cup joined to the neck of the outer container;

a bag disposed in the outer container, wherein the bag is integral with the valve cup, wherein the valve cup comprises threads; and a seal disposed below the threads.

2. The aerosol container according to claim 1 wherein the valve cup is directly joined to the neck without an intermediate component therebetween.

3. The aerosol container according to claim 1 wherein the bag and the valve cup comprise a laminate of overmolded materials.

4. The aerosol container according to claim 1 wherein the bag comprises a monolayer PET, PEN, EVOH, Nylon and combinations thereof.

5. The aerosol container according to claim 1 wherein the outer container and the valve cup are welded together in sealing relationship.

6. The aerosol container according to claim 1 wherein the valve cup further comprises a plurality of ribs, the ribs being usable to frictionally engage the valve cup to the outer container.

7. The aerosol container according to claim 2 wherein the valve cup has a valve cup outer diameter and the neck of the outer container has an outer neck diameter greater than the valve cup outer diameter.

8. An aerosol container comprising:

an outer container having an open neck with a top, and a valve cup joined to the outer container, wherein the valve cup comprises an interlock;

a bag integrally depending from the valve cup, the bag being disposed in the outer container, wherein the valve cup being sealingly joined to the top of the neck of the outer container.

9. The aerosol container according to claim 8 further comprising propellant between the outer container and the bag.

10. The aerosol container according to claim 9 wherein the outer container has a bottom, and the bag is not joined to the bottom of the outer container.

\* \* \* \* \*